United States Patent
Yamazaki et al.

(10) Patent No.: US 8,208,240 B2
(45) Date of Patent: Jun. 26, 2012

(54) LAMINATED CERAMIC CAPACITOR

(75) Inventors: Youichi Yamazaki, Kirishima (JP); Hideyuki Osuzu, Kirishima (JP); Yoshihiro Fujioka, Kirishima (JP); Daisuke Fukuda, Kirishima (JP)

(73) Assignee: Kyocera Corporation, Kyoto (JP)

( * ) Notice: Subject to any disclaimer, the term of this patent is extended or adjusted under 35 U.S.C. 154(b) by 340 days.

(21) Appl. No.: 12/670,855

(22) PCT Filed: Nov. 29, 2007

(86) PCT No.: PCT/JP2007/073094
§ 371 (c)(1),
(2), (4) Date: Jan. 26, 2010

(87) PCT Pub. No.: WO2009/016775
PCT Pub. Date: Feb. 5, 2009

(65) Prior Publication Data
US 2010/0188797 A1    Jul. 29, 2010

(30) Foreign Application Priority Data
Jul. 27, 2007    (JP) .................................. 2007-195905

(51) Int. Cl.
H01G 4/12    (2006.01)
C04B 35/468    (2006.01)
(52) U.S. Cl. ...................... 361/321.4; 501/138; 501/139
(58) Field of Classification Search ............... 361/321.4; 501/138, 139
See application file for complete search history.

(56) References Cited

U.S. PATENT DOCUMENTS

| | | | |
|---|---|---|---|
| 6,205,015 B1 | 3/2001 | Wada et al. | |
| 6,437,969 B2 | 8/2002 | Mizuno et al. | |
| 6,785,121 B2 | 8/2004 | Nakano et al. | |
| 6,853,536 B2 | 2/2005 | Nakamura et al. | |
| 7,057,876 B2 | 6/2006 | Fujioka et al. | |
| 7,433,173 B2 | 10/2008 | Iwasaki et al. | |
| 8,059,388 B2 * | 11/2011 | Yamazaki et al. | ......... 361/321.4 |
| 2001/0035563 A1 | 11/2001 | Masumiya et al. | |
| 2006/0023399 A1 | 2/2006 | Fujioka et al. | |
| 2006/0114641 A1 | 6/2006 | Iwasaki et al. | |

FOREIGN PATENT DOCUMENTS

| | | |
|---|---|---|
| JP | 2001-345230 A | 12/2001 |
| JP | 2005-277393 | 10/2005 |
| JP | 2005-281066 A | 10/2005 |
| JP | 2005-347288 | 12/2005 |
| JP | 2006-041371 A | 2/2006 |
| JP | 2006-156450 A | 6/2006 |
| JP | 2006-237237 A | 9/2006 |
| WO | WO-2006/103954 A1 | 10/2006 |

* cited by examiner

*Primary Examiner* — Karl Group
(74) *Attorney, Agent, or Firm* — Birch, Stewart, Kolasch & Birch, LLP

(57) ABSTRACT

A crystal constituting a dielectric porcelain, comprised of a first crystal group composed of crystal grains of 0.2 atomic % or less calcium concentration and a second crystal group composed of crystal grains of 0.4 atomic % or more calcium concentration, wherein the ratio of concentration of each of magnesium and a first rare earth element contained in a center portion to that contained in a surface layer portion of crystal grains constituting the first crystal group is greater than the corresponding concentration ratio of crystal grains constituting the second crystal group, and wherein on a polished surface resulting from polishing of the surface of the dielectric porcelain, when the area of crystal grains of the first crystal group is referred to as a and the area of crystal grains of the second crystal group referred to as b, the ratio of b/(a+b) is in the range of 0.5 to 0.8.

4 Claims, 3 Drawing Sheets

[FIG. 1]
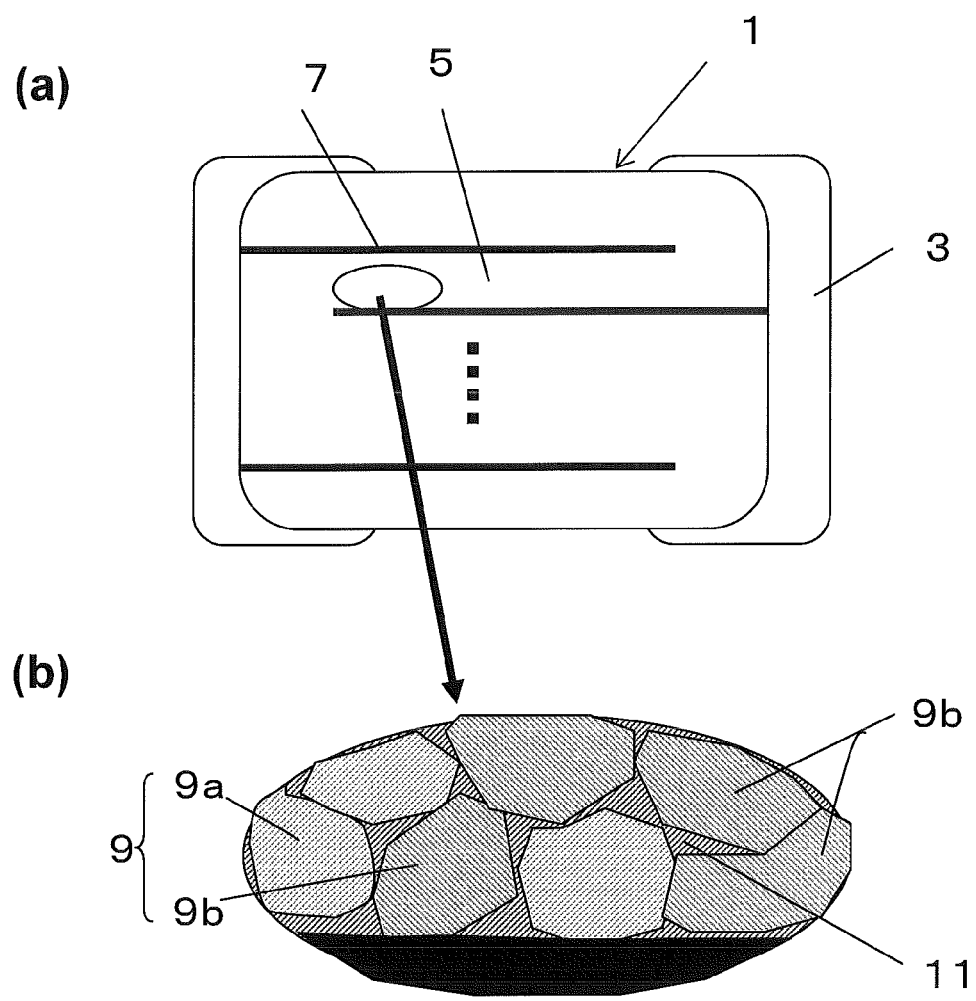

[FIG. 2]
(a)
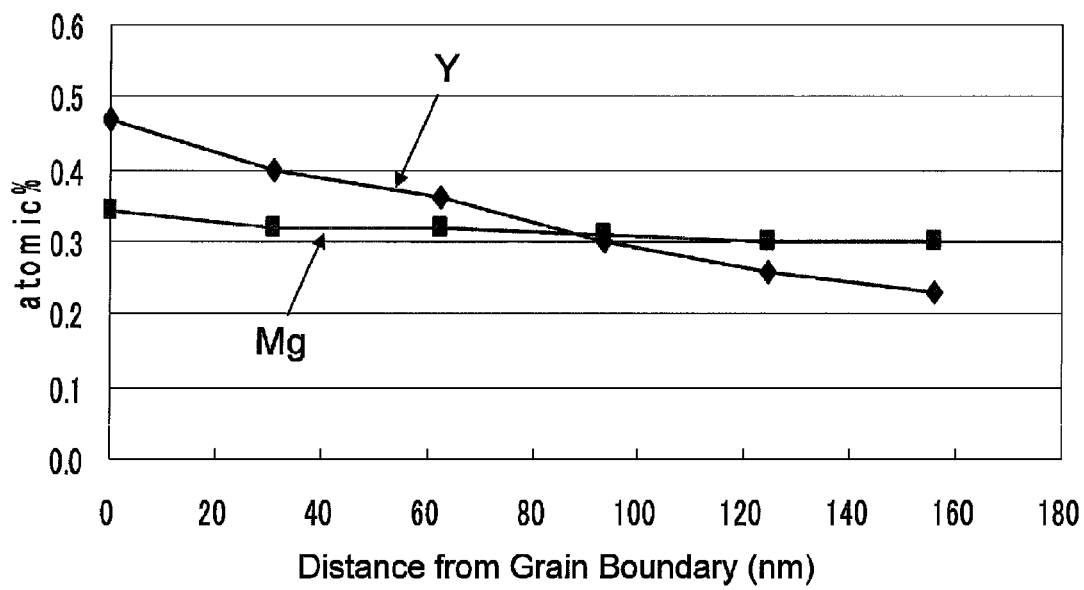
(b)
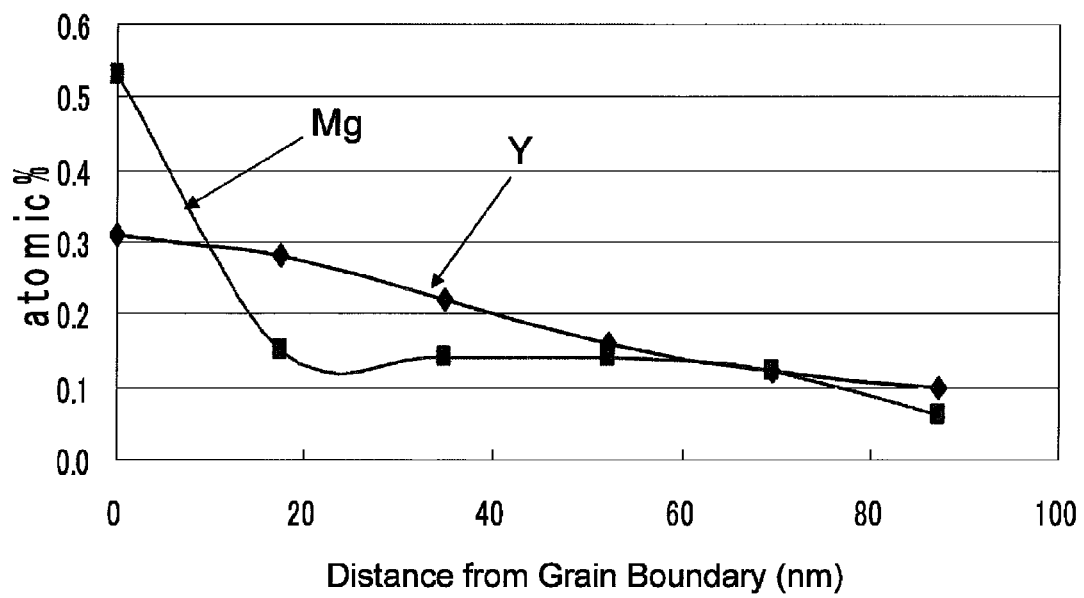

[FIG. 3]
(a) 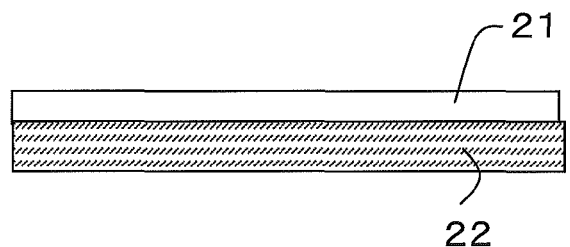
(b) 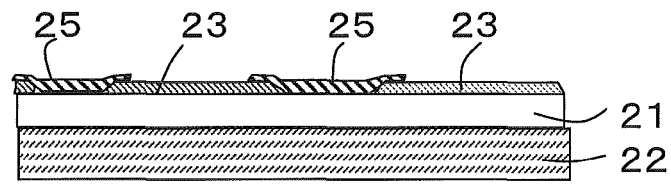
(c-1) 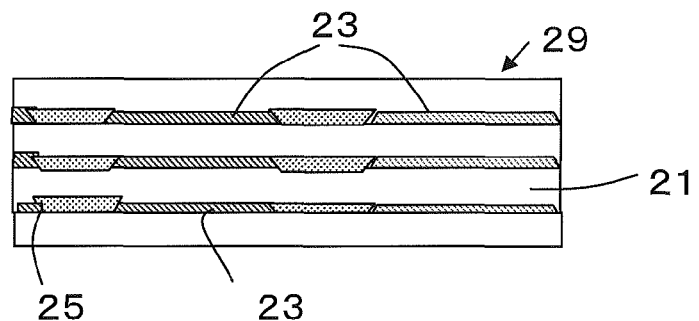
(c-2) 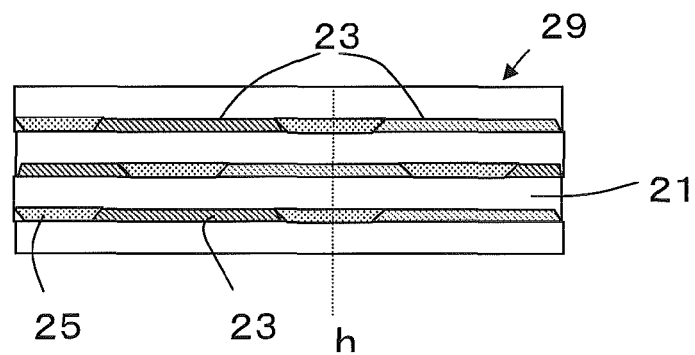

LAMINATED CERAMIC CAPACITOR

TECHNICAL FIELD

The present invention relates to a multilayer ceramic capacitor, and, in particular, to a multilayer ceramic capacitor that has a small size and a high capacitance and includes dielectric layers constituted by barium titanate crystal grains having different Ca concentrations.

BACKGROUND ART

With the recent trend toward widespread use of mobile devices such as cellular phones and achievement of higher speed and higher frequency in semiconductor devices serving as main components for personal computers, there is an ever increasing demand for a multilayer ceramic capacitor having a smaller size and a higher capacitance, the multilayer ceramic capacitor being implemented in such electronic devices. To provide such a multilayer ceramic capacitor, attempts have been made to reduce the thickness of dielectric layers constituting a multilayer ceramic capacitor and to increase the number of dielectric layers stacked.

For example, Patent Document 1 describes use of a mixture of a barium titanate powder (BCT powder) in which the A site is partially substituted by Ca and a barium titanate powder (BT powder) containing no Ca as dielectric powders constituting a dielectric ceramic. Such a combined use of two dielectric powders provides a multilayer ceramic capacitor in which fired dielectric layers are constituted by composite grains of crystal grains having a Ca concentration of 0.2 atomic % or less and crystal grains having a Ca concentration of 0.4 atomic % or more, both types of crystal grains containing barium titanate as the main component; and the thickness of the dielectric layers is reduced to 2 μm.

However, the multilayer ceramic capacitor disclosed in Patent Document 1 above and having dielectric layers constituted by the composite grains has a problem in that the insulation resistance gradually decreases while the capacitor is left in a high temperature environment for evaluation of the high temperature loading life.

Additionally, when the multilayer ceramic capacitor is produced, a capacitor body immediately after firing at a temperature of about 1200° C. in a reducing atmosphere and before formation of external electrodes has dielectric layers that are reduced and do not have practical insulation resistance and have a low relative dielectric constant.

For this reason, such a fired capacitor body generally needs to be subjected to a reoxidation treatment at a lower temperature than the temperature of the firing and in an atmosphere having a higher oxygen concentration than the oxygen concentration of the atmosphere used in the firing.

[Patent Document 1] Japanese Unexamined Patent Application Publication No. 2006-156450

It is an object of the present invention to provide a multilayer ceramic capacitor that suppresses a reduction in insulation resistance with time during a high-temperature load test and a high insulation resistance after firing.

MEANS FOR SOLVING THE PROBLEMS

According to the present invention, a multilayer ceramic capacitor comprises dielectric layers and internal electrode layers disposed alternately, the dielectric layers including a dielectric ceramic containing barium titanate as a main component, calcium, magnesium, vanadium, manganese, and a first rare-earth element of yttrium or holmium and a second rare-earth element of terbium or dysprosium. Crystals constituting the dielectric ceramic include a first crystal group constituted by crystal grains containing the barium titanate as a main component and containing the calcium in a concentration of 0.2 atomic % or less and a second crystal group constituted by crystal grains containing the barium titanate as a main component and containing the calcium in a concentration of 0.4 atomic % or more. Each crystal grains of the first crystal group and the second crystal group comprise magnesium, vanadium, manganese, the first rare-earth element and the second rare-earth element.

Ratios (C2/C1) of concentrations (C2) of the magnesium and the first rare-earth element contained in center portions of the crystal grains constituting the first crystal group to concentrations (C1) of the magnesium and the first rare-earth element contained in surface portions of the crystal grains constituting the first crystal group are respectively larger than ratios (C4/C3) of concentrations (C4) of the magnesium and the first rare-earth element contained in center portions of the crystal grains constituting the second crystal group to concentrations (C3) of the magnesium and the first rare-earth element contained in surface portions of the crystal grains constituting the second crystal group. Furthermore, b/(a+b) is 0.5 to 0.8 where, in a polished surface obtained by polishing a surface of the dielectric ceramic, a represents an area of the crystal grains constituting the first crystal group and b represents an area of the crystal grains constituting the second crystal group.

ADVANTAGES

According to the present invention, dielectric layers constituting a multilayer ceramic capacitor contain vanadium. Each of the dielectric layers includes crystal grains (hereinafter, referred to as a "first crystal group") each composed of barium titanate as a main component and having a calcium content (hereinafter, referred to as a "Ca content") of 0.2 at. % or less; and crystal grains (hereinafter, referred to as a "second crystal group") each composed of barium titanate as a main component and having a Ca content of 0.4 at. % or more, the first and second crystal groups being present in a predetermined ratio. The ratio of the concentration of magnesium in the surface portion to that in the center portion of each of the crystal grains constituting the first crystal group is larger than the ratio of the concentration of magnesium in the surface portion to that in the center portion of each of the crystal grains constituting the second crystal group. The ratio of the concentration of a first rare-earth element in the surface portion to that in the center portion of each of the crystal grains constituting the first crystal group is larger than the ratio of the concentration of a first rare-earth element in the surface portion to that in the center portion of each of the crystal grains constituting the second crystal group. The b/(a+b) is set in the range of 0.5 to 0.8.

That is, the ratios (C2/C1) of the concentrations (C2) of magnesium and a first rare-earth element contained in center portions of the crystal grains constituting the first crystal group to the concentrations (C1) of magnesium and the first rare-earth element in surface portions of the crystal grains constituting the first crystal group are respectively larger than the ratios (C4/C3) of the concentrations (C4) of magnesium and the first rare-earth element contained in center portions of the crystal grains constituting the second crystal group to the concentrations (C3) of magnesium and the first rare-earth element in surface portions of the crystal grains constituting the second crystal group.

BRIEF DESCRIPTION OF DRAWINGS

FIG. 1(a) is a schematic sectional view showing an example of a multilayer ceramic capacitor according to the present invention. FIG. 1(b) is an enlarged schematic view showing crystal grains and a grain boundary phase in a dielectric layer.

FIG. 2(a) is a graph showing concentration distributions of Mg and Y in crystal grains constituting the first crystal group in dielectric layers constituting a multilayer ceramic capacitor according to the present invention.

FIG. 2(b) is a graph showing the concentration distributions of Mg and Y in crystal grains constituting the second crystal group in dielectric layers constituting a multilayer ceramic capacitor according to the present invention.

FIGS. 3(a) to (c-2) are process charts showing an example of a method for producing a multilayer ceramic capacitor according to the present invention.

BEST MODES FOR CARRYING OUT THE INVENTION

A multilayer ceramic capacitor according to the present invention will be described in detail on the basis of the schematic sectional view in FIG. 1. FIG. 1(a) is a schematic sectional view showing an example of a multilayer ceramic capacitor according to the present invention. FIG. 1(b) is an enlarged schematic view showing crystal grains and a grain boundary phase in a dielectric layer.

Referring to FIG. 1(a), a multilayer ceramic capacitor according to the present invention includes external electrodes 3 at both ends of a capacitor body 1. The external electrodes 3 are formed by, for example, baking Cu or an alloy paste containing Cu and Ni.

The capacitor body 1 includes dielectric layers 5 composed of a dielectric ceramic and a plurality of internal electrode layers 7 disposed alternately. Although FIG. 1(a) shows a simplified laminate configuration of the dielectric layers 5 and the internal electrode layers 7, a multilayer ceramic capacitor according to the present invention actually includes a laminate constituted by several hundred layers of the dielectric layers 5 and the internal electrode layers 7.

The internal electrode layers 7 desirably comprise a base metal such as nickel (Ni) or copper (Cu) because a large number of the layers can be laminated at a reduced production cost. In particular, nickel (Ni) is desirable since the internal electrode layers 7 and the dielectric layers 5 can be co-fired in the present invention.

The dielectric layers 5 are constituted by crystal grains 9 and a grain boundary phase 11 as shown in FIG. 1(b). Grain boundary phases 11 are each an amorphous phase or another crystal phase resulting from an additional component, e.g., magnesium, a rare earth element, manganese, or vanadium, or a sintering agent, e.g., glass. Each of the grain boundary phases 11 is formed by liquid-phase sintering of barium titanate, which is the main component, and the additional component or the sintering agent.

The dielectric layers 5 preferably have a thickness of 3 μm or less, in particular, 2.5 μm or less. As a result, a multilayer ceramic capacitor can have a small size and a high capacitance. When the dielectric layers 5 have a thickness of 1 μm or more, variation in the capacitance can be reduced and the temperature characteristic of the capacitance can be stabilized.

The crystal grains 9 are constituted by crystal grains 9a constituting a first crystal group and crystal grains 9b constituting a second crystal group. The crystal grains 9a contain barium titanate as a main component and have a Ca concentration of 0.2 atomic % or less. The crystal grains 9b contain barium titanate as a main component and have a Ca concentration of 0.4 atomic % or more.

In particular, the crystal grains having a Ca concentration of 0.4 atomic % or more in the second crystal group 9b preferably have a Ca concentration of 0.5 to 2.5 atomic %. When the Ca concentration is in this range, a sufficiently high amount of Ca can dissolve in barium titanate and the amount of Ca compounds remaining in grain boundaries and the like without dissolving in barium titanate can be reduced. As a result, the relative dielectric constant becomes highly dependent on an AC electric field and hence the crystal grains can be made to have a higher relative dielectric constant. The crystal grains 9a of the first crystal group include crystal grains having a Ca concentration of 0.

The Ca concentration of the crystal grains 9 is obtained first by polishing a section of dielectric layers 5 constituting a multilayer ceramic capacitor. Regarding grinding conditions, for example, a sample is roughly ground with a grinder and then subjected to ion milling until a hole is formed at a center portion of a sample. Then, about 30 crystal grains 9 present in a polished surface obtained by ion milling are subject to elemental analysis with a transmission electron microscope equipped with an elemental analysis device. In this case, the spot size of electron beams is 5 nm. The analysis is conducted at four to five points that are on a straight line drawn from near the grain boundary to the center of each crystal grain 9 and are spaced apart from each other at substantially equal intervals. An average value of the resultant analysis values is determined as the Ca concentration. In this case, the Ca concentration is determined with respect to the total amount (100%) of Ba, Ti, Ca, V, Mg, a rare-earth element, and Mn determined at each measurement point of the crystal grain 9.

The crystal grains 9 are selected in the following manner. The areas of crystal grains are measured by image processing on the basis of the contours of the grains. The diameters of the grains are calculated as the diameters of circles having the same areas as the grains. Crystal grains that have the resultant diameters within the range of ±30% from the mean crystal grain diameter obtained by a method described below are selected as the crystal grains 9.

The centers of the crystal grains 9 are defined as the centers of the inscribed circles of the crystal grains 9. "Near grain boundary of a crystal grain" refers to a region within 5 nm inward from the grain boundary of the crystal grain 9. An image projected in a transmission electron microscope is input into a computer and the inscribed circles of the crystal grains 9 are drawn on the image on the screen of the computer. Thus, the centers of the crystal grains are determined. The inscribed circle is defined as the largest inscribed circle surrounded by the crystal grains 9.

The dielectric ceramic constituting the dielectric layers 5 and the crystal grains 9 contain barium titanate as a main component and contain the first rare-earth element of yttrium or holmium and a second rare-earth element of terbium or dysprosium in addition to manganese and vanadium.

It is important that such a dielectric ceramic contains 0.2 to 1.8 moles of magnesium in terms of MgO, 0.2 to 1.5 moles of the first rare-earth element in terms of $RE_2O_3$, 0.1 to 0.7 mole of the second rare-earth element in terms of $RE_2O_3$, 0.07 to 0.5 moles of manganese in terms of MnO, and 0.05 to 0.5 moles of vanadium in terms of $V_2O_5$, based on 100 moles of barium titanate.

In particular, such a dielectric ceramic desirably contains 0.3 to 1.5 mole of magnesium in terms of MgO, 0.3 to 1.5 mole of the first rare-earth element in terms of $RE_2O_3$, 0.1 to 0.3 mole of the second rare-earth element in terms of $RE_2O_3$, 0.07 to 0.5 moles of manganese in terms of MnO, and 0.1 to 0.4 moles of vanadium in terms of $V_2O_5$, based on 100 moles of titanium constituting barium titanate. Thereby, each of the dielectric layers 5 has an insulation resistance of $1\times10^8\Omega$ or more after reduction firing and re-reduction firing and has an insulation resistance of $1\times10^7\Omega$ or more 100 hours after the high-temperature load test. The term RE is an acronym for rare-earth element and based on English used in the periodic table.

A dielectric ceramic after reduction firing and re-reduction firing has an insulation resistance of less than $1\times10^8\Omega$ when the content of vanadium is less than 0.05 moles or more than 0.5 moles in terms of $V_2O_5$ based on 100 moles of barium titanate contained in the dielectric ceramic; when the content of magnesium is less than 0.3 moles or more than 1.5 moles based on 100 moles of barium titanate contained in the dielectric ceramic; or when a total content of the first rare-earth element and the second rare-earth element is less than 0.5 moles or more than 1.9 moles in terms of $RE_2O_3$ based on 100 moles of barium titanate contained in the dielectric ceramic.

An important point here is that ratios of concentrations of magnesium and the first rare-earth element in the center portions of the crystal grains 9a constituting the first crystal group to those in the surface portions of the crystal grains 9a are larger than ratios of concentrations of magnesium and the first rare-earth element in the center portions of the crystal grains 9b constituting the second crystal group to those in the surface portions of the crystal grains 9b. Specific examples will be described below.

FIG. 2(a) is a graph showing the concentration distributions of magnesium and yttrium in crystal grains constituting the first crystal group 9a in dielectric layers constituting a multilayer ceramic capacitor according to the present invention. FIG. 2(b) is a graph showing the concentration distributions of magnesium and yttrium in crystal grains constituting the second crystal group 9b in dielectric layers constituting a multilayer ceramic capacitor according to the present invention. These examples are obtained by evaluating Sample No. 5 in Example described below.

The ratios of the concentrations of magnesium and the first rare-earth element are measured with a transmission electron microscope equipped with an elemental analysis device (EDS). In this case, samples to be analyzed are obtained by polishing a multilayer ceramic capacitor and selecting the crystal grains 9a of the first crystal group and the crystal grains 9b of the second crystal group on the thus-polished surface of the dielectric layers 5. The crystal grains 9a and the crystal grains 9b are determined in accordance with the measurement of the Ca concentration described above. Regarding grinding conditions, for example, a sample is roughly ground with a grinder and then subjected to ion milling so as to be perforated to the center portion of a sample.

The areas of selected crystal grains are measured by image processing on the basis of the contours of the grains. The diameters of the grains are calculated as the diameters of circles having the same areas as the grains. Crystal grains that have diameters within the range of ±30% from the mean crystal grain diameter of each crystal grains 9a and 9b are obtained by a measurement method described below. Ten crystal grains in this range are respectively selected in terms of the crystal grains 9a of the first crystal group and the crystal grains 9b of the second crystal group.

The spot size of electron beams in elemental analysis is 1 to 3 nm. The analysis is conducted for the surface portion and the center portion of a crystal grain. The surface portion of a crystal grain is defined as a region within 3 nm from the grain boundary of the crystal grain in a section of the crystal grain. The center portion of a crystal grain is defined as a region within a circle having its center at the center of the inscribed circle of the crystal grain in a section of the crystal grain and having a radius of ⅓ of the radius of the inscribed circle. In this case, the inscribed circle of the crystal grain is drawn on an image projected in a transmission electron microscope on the screen of a computer. On the basis of the image on the screen, the center portion of the crystal grain is determined. The inscribed circle is defined as the largest inscribed circle surrounded by the crystal grains 9.

The concentrations of magnesium and the first rare-earth element (CM1 and CR1) in the surface portions of the crystal grains 9a and the concentrations of magnesium and the first rare-earth element (CM2 and CR2) in the center portions of the crystal grains 9a are then determined. The concentrations of magnesium and the first rare-earth element (CM3 and CR3) in the surface portions of the crystal grains 9b and the concentrations of magnesium and the first rare-earth element (CM4 and CR4) in the center portions of the crystal grains 9b are also determined. On the basis of the thus-measured concentrations of magnesium and the rare-earth element in the crystal grains, the concentration ratios (CM2/CM1, CR2/CR1, CM4/CM3, and CR4/CR3) of magnesium and the rare-earth element between the surface portions and the center portions of the crystal grains 9a and 9b are obtained. Specifically, ten crystal grains are each subjected to this procedure and the average values of the resultant values are used.

In a graph shown in each of FIGS. 2(a) and 2(b), a grain boundary (distance: 0 nm) constitutes part of the surface portion of each crystal grain 9. In each graph, an end point of measurement located apart from the surface portion (0 to 3 nm) in the depth direction is one of the measurement points located in the center portion of each crystal grain 9.

As shown in FIGS. 2(a) and 2(b), the concentrations of magnesium and yttrium (first rare-earth element) vary more mildly from the surface portions to the center portions of the crystal grains in the crystal grains 9a constituting the first crystal group than in the crystal grains 9b constituting the second crystal group. The concentrations of magnesium and yttrium considerably vary from the surfaces to the center portions of the crystal grains 9b of the second crystal group.

Thereby, magnesium and yttrium further diffuse and dissolve to the inside of crystal grains in the crystal grains 9a of the first crystal group than in the crystal grains 9b of the second crystal group. Thus, the core-shell structure of the crystal grains 9a of the first crystal group containing barium titanate as a main component and formed by a solid solution with at least magnesium and rare-earth element is changed and comes to have high cubicity. In contrast, as described above, the core-shell structure of the crystal grains 9b of the second crystal group is maintained because each of the concentrations of magnesium and yttrium is greatly different between the surface portion and the center portion of each crystal grain 9 and because each of the concentrations of magnesium and yttrium is low inside each crystal grain 9.

The core-shell structure defined here is used to indicate a structure including a core located in the center portion of a crystal grain and a shell located outside the core. In a crystal grain formed of a solid solution of at least magnesium and a rare-earth element with barium titanate serving as a main component, a core has a tetragonal crystal structure, and a shell has a cubic crystal structure. Concentration gradients of magnesium and the rare-earth element in the shell from the surface toward the core are larger than those of magnesium and the rare-earth element in the core in the same direction.

That is, an important point in the present invention is that the dielectric layers 5 contain vanadium and that the ratios (the foregoing ratios of concentrations: CM2/CM1 and CR2/CR1) of concentrations of magnesium and the first rare-earth element in the center portions of the crystal grains 9a constituting the first crystal group to concentrations of magnesium and the first rare-earth element in the surface portions of the crystal grains 9a constituting the first crystal group are larger than the ratios (the foregoing ratios of concentrations: CM4/CM3 and CR4/CR3) of concentrations of magnesium and the first rare-earth element in the center portions of the crystal grains 9b constituting the second crystal group to concentrations of magnesium and the first rare-earth element in the surface portions of the crystal grains 9b constituting the second crystal group. The coexistence of the crystal grains 9a of the first crystal group having high insulating properties and the crystal grains 9b of the second crystal group enables the dielectric layers 5 to have a high insulation resistance even after firing and suppresses a reduction in insulation resistance with time during the high-temperature load test.

In the present invention, C1 corresponds to CM1 and CR1; C2 corresponds to CM2 and CR2; C3 corresponds to CM3 and CR3; and C4 corresponds to CM4 and CR4.

Holmium and yttrium, which serve as the first rare-earth elements, each have an ionic radius of 0.901 Å or less and a low solid solubility in crystal grains mainly composed of barium titanate, thereby increasing the concentration gradient toward crystal grain interiors. In the present invention, the incorporation of vanadium results in a higher solid solubility of magnesium and the first rare-earth element in the crystal grains 9a of the first crystal group than that in the crystal grains 9b of the second crystal group. This allows the crystal grains 9a of the first crystal group to have a high cubicity, thereby increasing the insulation properties of the dielectric ceramic.

In the multilayer ceramic capacitor of the present invention, as described above, the dielectric ceramic contains one element selected from yttrium and holmium, which are the first rare-earth elements, and one element selected from terbium and dysprosium, which are the second rare-earth elements.

That is, in the present invention, the incorporation of one rare-earth element selected from terbium and dysprosium in addition to the first rare-earth element selected from holmium and yttrium into the dielectric ceramic improves the insulation properties of the dielectric ceramic. The reason for this is that terbium and dysprosium each have an ionic radius of 0.912 Å or more and a high solid solubility in the crystal grains mainly composed of barium titanate. Thus, a small amount of one rare-earth element selected from terbium and dysprosium is added and then forms a solid solution with each crystal grain, the solid solution having a relatively low concentration of terbium or dysprosium that is substantially uniformly distributed therein. This provides the effect of further enhancing the insulation properties in the grains without reducing a relative dielectric constant compared with the case of using only one rare-earth element. In particular, it is possible to suppress a reduction in insulation resistance after the high-temperature load test. In this case, a combination of yttrium and terbium is desired as the rare-earth elements, thereby further suppressing the reduction in insulation resistance 100 hours after the high-temperature load test. Desirably, yttrium, which is the first rare-earth element, is in the range of 0.3 to 1.5 mol, and terbium, which is the second rare-earth element, is in the range of 0.1 to 0.3 mol.

If crystal grains constituting the dielectric layers 5 include both the crystal grains 9a of the first crystal group and the crystal grains 9b of the second crystal group, a high insulation resistance is obtained after reduction firing as described above, and the resultant multilayer ceramic capacitor becomes resistant to reduction even when being subjected to a reduction treatment again and the multilayer ceramic capacitor can maintain high insulation resistance.

In contrast, in the case where the ratios (C2/C1) of concentrations of magnesium and the first rare-earth element in the center portions of the crystal grains 9a constituting the first crystal group to concentrations of magnesium and the first rare-earth element in the surface portions of the crystal grains 9a constituting the first crystal group are equal to or lower than the ratios (C4/C3) of concentrations of magnesium and the first rare-earth element in the center portions of the crystal grains 9b constituting the second crystal group to concentrations of magnesium and the first rare-earth element in the surface portions of the crystal grains 9b constituting the second crystal group, the crystal grains 9a of the first crystal group have low solid solubilities of magnesium and the rare-earth element and high tetragonality because the core-shell structure is maintained. Thus, the dielectric layers 5 constituting the multilayer ceramic capacitor have a low insulation resistance after firing.

The mean diameter of the crystal grains 9a of the first crystal group and the crystal grains 9b of the second crystal group which constitute the dielectric layers 5 is preferably 0.45 μm or less. In this case, a high insulation property can be provided even when the thickness of the dielectric layers 5 is reduced and higher capacitance can also be achieved. The crystal grains 9 preferably have a grain diameter of 0.15 μm or more. This increases the relative dielectric constant of the dielectric layers 5 and decreases the temperature dependency of the relative dielectric constant, which are advantageous.

In addition, in the present invention, the mean diameter of the crystal grains 9a of the first crystal group is preferably larger than the mean diameter of the crystal grains 9b of the second crystal group. As a result, high temperature loading test thereby further suppressing the reduction in insulation resistance of a multilayer ceramic capacitor after the high-temperature load test can be further suppressed. More preferably, in the present invention, the mean diameter of the crystal grains 9a of the first group is larger than the mean diameter of the crystal grains 9b of the second group by 0.02 μm or more. If the dielectric layers 5 contain both the crystal grains 9a of the first crystal group and the crystal grains 9b of the second crystal group in a dielectric ceramic, the crystal grains 9a having high cubicity and high insulation resistance and being larger than the crystal grains 9b, the dielectric layers 5 can have further increased insulation resistance.

The first crystal group and the second crystal group constituting the dielectric ceramic. The mean diameter of the crystal grains 9a constituting the first crystal group and the mean diameter of the crystal grains 9b constituting the second crystal group can be calculated from the areal data of the crystal grains 9a constituting the first crystal group and the crystal grains 9b constituting the second crystal group, the areal data being obtained when the Ca concentration is determined above. In this case, a polished surface is obtained by polishing a section of the dielectric layers and polished by ion milling until a hole is formed at the center thereof the surface is observable, and an image of the polished surface is projected in a transmission electron microscope, is input into a computer. The contours of crystal grains on the screen of the computer are subjected to image processing and the areas of the crystal grains are measured. The diameters of the grains are calculated as the diameters of circles having the same areas as the grains. Each mean diameter is obtained as a mean value of the thus-calculated diameters of about 50 crystal grains.

An image of a polished surface obtained by polishing a section of the dielectric layers and projected in a transmission electron microscope is input into a computer. A diagonal line is drawn on the image on the screen of the computer and the areas of crystal grains on the diagonal line are measured by subjecting the contours of the grains to image processing. The diameters of the grains are calculated as the diameters of circles having the same areas as the grains. The mean diameter of the whole crystal grains 9 constituted by the crystal grains 9a constituting the first crystal group and the crystal grains 9b constituting the second crystal group is obtained as a mean value of the thus-calculated diameters of about 50 crystal grains.

In the present invention, the dielectric layers 5 has b/(a+b) of 0.5 to 0.8 where a represents the area of the crystal grains 9a of the first crystal group and b represents the area of the crystal grains 9b of the second crystal group in a polished surface obtained by polishing a surface of the dielectric ceramic. Thereby, the insulation resistance of such a multilayer ceramic capacitor can be increased to $9 \times 10^6 \Omega$ or more immediately after being fired in a reducing atmosphere, and such a multilayer ceramic capacitor can be made to have an insulation resistance of $9 \times 10^6 \Omega$ or more even in the case of being subjected to a reoxidation treatment and subsequently to a reduction treatment again.

In contrast, the insulation resistance having b/(a+b) less than 0.5 or larger than 0.8 of a multilayer ceramic capacitor may be less than $9 \times 10^6 \Omega$ immediately after multilayer ceramic capacitor is fired in a reducing atmosphere, and after multilayer ceramic capacitor is subjected to a reoxidation treatment and subsequently to a reduction treatment again.

In this case, the proportion of the area of the crystal grains 9a of the first crystal group and the area of the crystal grains 9b of the second crystal group can be calculated from the areal data for calculating Ca content as described above. Crystal grains having a Ca concentration of 0.2 atomic % or less are categorized as the crystal grains 9a of the first crystal group and crystal grains having a Ca concentration of 0.4 atomic % or more are categorized as the crystal grains 9b of the second crystal group.

Descriptions have been made of the components of vanadium, magnesium, rare-earth elements, manganese, and so forth contained in the dielectric layers 5 constituting the multilayer ceramic capacitor of the present invention and the crystal structures of the crystal grains 9. However, in the present invention, a glass component may be added as an auxiliary for enhancing the sintering property in addition to the components such as calcium, vanadium, magnesium, a rare-earth element and manganese, as long as desired dielectric characteristics can be maintained.

Next, a method for producing a multilayer ceramic capacitor according to the present invention is described on the basis of FIG. 3. FIG. 3 is a process chart showing a method for producing a multilayer ceramic capacitor according to the present invention. FIG. 3(a) shows a step of forming a ceramic green sheet on a base. FIG. 3(b) indicates a step of forming an internal electrode pattern and a ceramic pattern on the ceramic green sheet. FIG. 3(c-1: side-margin direction) and FIG. 3(c-2: end-margin direction) show a step of stacking ceramic green sheets having the internal electrode pattern and the ceramic pattern.

First, ceramic slurry is prepared by mixing material powders described below, an organic resin such as a polyvinyl butyral resin, and solvents such as toluene and alcohol with a ball mill. Then, as shown in FIG. 3(a), ceramic green sheets 21 are then formed on a substrate 22 with the thus-prepared ceramic slurry by a sheet forming method such as a doctor blade method or a die coater method. The ceramic green sheets 21 preferably have a thickness of 1 to 4 μm so that the thickness of the dielectric layers 5 is reduced to provide high capacitance and a high insulation property is maintained.

A barium titanate powder in which calcium dissolves in barium titanate (hereinafter, referred to as a BCT powder) and a barium titanate powder which contain no Ca (hereinafter, referred to as a BT powder) are mixed to prepare a mixture of 30% to 70% by mole of a BCT power and 70% to 30% by mole of a BT powder is used. These dielectric powders are raw powders represented by $(Ba_{1-x}Ca_x)TiO_3$ and $BaTiO_3$, respectively. An amount of Ca substitution at the A site preferably satisfies X=0.01 to 0.2, particularly X=0.03 to 0.1, for BCT.

The BCT powder containing A site (barium) and B site (titanium) preferably has an atomic ratio A/B of 1.003 or more. The BT powder preferably has an A/B of 1.002 or less. When the BT powder has an A/B of 1.002 or less, additives such as Mg and a rare-earth element dissolve in barium titanate to a higher degree, which is advantageous.

The BT powder and the BCT powder are synthesized by mixing compounds containing a Ba component, a Ca component, and a Ti component so as to achieve certain compositions. These dielectric powders are obtained by a synthetic method selected from a solid phase method, a liquid phase method (including a generation method via oxalate), a hydrothermal synthesis method, and the like. In particular, a dielectric powder obtained by a hydrothermal synthesis method is preferable because such a dielectric powder has narrow particle size distribution and high crystallinity.

The average particle diameter of the BT powder and the BCT powder used as dielectric powders is preferably 3 μm in view of facilitating the formation of the dielectric layers 5 each having a smaller thickness and increasing the relative dielectric constant of the dielectric powder.

Magnesium oxide, an oxide of the first rare-earth element, an oxide of the second rare-earth element, manganese oxide, and vanadium oxide are selected as additives added to the dielectric powder described above.

The additives are preferably added to a mixed powder of the BT powder and the BCT powder such that, based on 100 molar parts of a dielectric powder that is a mixture of the BT powder and the BCT powder, the amount of Mg is 0.2 to 1.8 molar parts in terms of MgO, the amount of the first rare-earth element (RE) is 0.2 to 1.5 molar parts in terms of $RE_2O_3$, the amount of the second rare-earth element (RE) is 0.1 to 0.7 molar parts in terms of $RE_2O_3$, the amount of Mn is 0.07 to 0.5 molar parts in terms of MnO, and the amount of vanadium is 0.05 to 0.5 molar parts in terms of $V_2O_5$; in particular, the amount of Mg is 0.3 to 1.5 molar part in terms of MgO, the amount of the first rare-earth element is 0.3 to 1.5 molar part in terms of $RE_2O_3$, the amount of the second rare-earth element (RE) is 0.1 to 0.3 molar parts in terms of $RE_2O_3$, the amount of Mn is 0.07 to 0.5 molar parts in terms of MnO, and the amount of vanadium is 0.1 to 0.4 molar parts in terms of $V_2O_5$.

Regarding the oxides of the rare-earth elements, particle surfaces of the BT powder, the BCT powder, or the mixture thereof are coated with the oxide of the first rare-earth element selected from holmium and yttrium having an ionic radius of 0.901 Å or less under heat by a solution method and then mixed with a powder of the second rare-earth element selected from dysprosium and terbium. Coating the particle surfaces of the BT powder with the first rare-earth element selected from holmium and yttrium makes it possible to limit the formation of a solid solution of the second rare-earth element powder, which is subsequently added and easily forming a solid solution with barium titanate, with the barium titanate powder.

In the present invention, since a glass component may be added as a sintering auxiliary for enhancing the sintering property in addition to the components such as calcium, vanadium, magnesium, a rare-earth element and manganese as long as desired dielectric characteristics can be maintained, a glass powder composed of, for example, $Li_2O$, $SiO_2$, BaO, and CaO can be added as a sintering auxiliary to the above-mentioned dielectric powders. The amount of such a sintering auxiliary to be added is preferably 0.5 to 2 parts by mass based on 100 parts by mass of the dielectric powder, which is a mixture of the BCT powder and the BT powder. In this case, the sintering property of dielectric layers can be enhanced while the grain growth of crystal grains can be suppressed. The composition of the glass powder is preferably $Li_2O$=1 to 15 mole %, $SiO_2$=40 to 60 mole %, BaO=15 to 35 mole %, and CaO=5 to 25 mole %.

Next, as shown in FIG. 3($b$), internal electrode patterns 23 having the shape of a rectangle are formed by printing on main surfaces of the ceramic green sheets 21 obtained above. A conductor paste with which the internal electrode patterns 23 are formed is prepared by mixing Ni, Cu, or an alloy powder of Ni and Cu as a main metal component and a ceramic powder as another component, and adding an organic binder, a solvent, and a dispersing agent to the resultant mixture. BT powder, BCT powder and a mixture of BT powder and BCT powder can be preferably used as a ceramic.

The internal electrode patterns 23 preferably have a thickness of 1 μm or less to reduce the size of the resultant multilayer ceramic capacitor and to reduce the irregularities generated by the internal electrode patterns 23.

In the present invention, to overcome the irregularities generated by the internal electrode patterns 23 on the ceramic green sheets 21, ceramic patterns 25 are preferably formed around the internal electrode patterns 23 so as to have substantially the same thickness as that of the internal electrode patterns 23. The ceramic component of the ceramic patterns 25 preferably has the same composition as that of the dielectric powder for forming the ceramic green sheets to provide the same firing shrinkage in cofiring.

Next, as shown in FIGS. 3($c$-1) and 3($c$-2), a quasi-green-laminate of the ceramic green sheets 21 is formed by stacking a desired number of the ceramic green sheets 21 on which the internal electrode patterns 23 are formed and further stacking a plurality of ceramic green sheets 21 without the internal electrode patterns 23 on the top and the bottom of the resultant stack so that the number of the ceramic green sheets 21 without the internal electrode patterns 23 stacked on the top is the same as that on the bottom. The internal electrode patterns 23 in the quasi-green-laminate are staggered by a distance corresponding to a half pattern in the longitudinal direction. Such a stacking manner will provide a laminate having the internal electrode patterns 23 exposed alternately on the end surfaces of the laminate after being cut.

In the present invention, other than the manner of stacking the ceramic green sheets 21 on the main surfaces of which the internal electrode patterns 23 are formed in advance, a quasi-green-laminate may also be formed as described below. Specifically, the ceramic green sheet 21 is brought into close contact with a lower base, the internal electrode pattern 23 is subsequently printed on this ceramic green sheet 21, the internal electrode pattern 23 is dried, and the ceramic green sheet 21 on which no internal electrode pattern 23 is printed is subsequently placed on the thus-printed-and-dried internal electrode pattern 23 to temporarily being brought into close contact with the internal electrode pattern 23.

The quasi-green-laminate is subsequently pressed under conditions at higher temperature and at higher pressure than the temperature and the pressure in the stacking described above. As a result, a laminate 29 is formed in which the ceramic green sheets 21 and the internal electrode patterns 23 are strongly bonded to each other.

The laminate 29 is then cut and a capacitor body is formed so as to alternately expose opposite ends of each internal electrode pattern 23 in the stacking direction and so as not to expose the widest portion of the internal electrode pattern 23 at side-margin portions.

The capacitor compact body is subsequently fired in a certain atmosphere and under a certain temperature condition to form a capacitor body 1. The capacitor body may be chamfered for the edge line portions and the capacitor body 1 may also be subjected to barrel polishing to expose the internal electrode layers at opposite end surfaces of the capacitor body 1 in some cases.

In the manufacturing method according to the present invention, the firing is conducted under the following conditions. A sample is degreased at a heating rate of 5° C./h to 20° C./h in a temperature range up to 500° C. The firing temperature is a maximum temperature of a range of 1100° C. to 1250° C. and a heating rate is 200° C./h to 500° C./h from the degrease to the maximum temperature in a reducing atmosphere of a mixed gas of hydrogen-nitrogen. The maximum temperature is kept for 0.5 to 4 hours. The cooling rate is 200° C./h to 500° C./h from the maximum temperature to 1000° C. is 200 to 500° C., and the atmosphere is hydrogen-nitrogen. A temperature and atmosphere of a heating treatment (reoxidation treatment) is a range of 900° C. to 1100° C. and nitrogen, respectively.

Then, an external electrode paste is then applied to the opposite ends of the capacitor body 1 and the applied paste is baked to form the external electrodes 3. To enhance the implementation property, a plated film is formed on the surfaces of the external electrodes 3, thereby providing a multilayer ceramic capacitor according to the present invention.

Hereinafter, the present invention is described in further detail with reference to examples. However, the present invention is not restricted to the following examples.

EXAMPLES

<Production of Multilayer Ceramic Capacitor>

The following material powders were prepared and mixed in accordance with the proportions shown in Table 1: a BT powder, a BCT powder ($Ba_{0.95}Ca_{0.05}TiO_3$), MgO, $Y_2O_3$, $Dy_2O_3$, $Ho_2O_3$, $Tb_2O_3$, $MnCO_3$ and $V_2O_5$. These material powders had a purity of 99.9%. The BT powder and the BCT powder had a mean particle diameter of 100 nm in Sample Nos. 1 to 28 and 30 to 40. In Sample No. 29, the BCT powder had a mean particle diameter of 0.24 μm and the BT powder had a mean particle diameter of 0.2 μm. The amounts of MgO, $Y_2O_3$, $Dy_2O_3$, $Ho_2O_3$, $Er_2O_3$, $MnCO_3$, and $V_2O_5$ added shown in Table 1 are values with respect to 100 mol of the total amount of the BT powder and the BCT powder. The Ba/Ti ratio of the BT powder was 1.001 and the Ba/Ti ratio of the BCT powder was 1.003.

Particles of the BT powder and the BCT powder were coated with the rare-earth element by mixing the powders with an aqueous solution containing the first rare-earth element by a liquid-phase method and then heating the resulting mixture. Regarding the second rare-earth element, an oxide powder having an average particle diameter of 0.05 μm was used. Table 1 shows the amounts of the oxide of the first rare-earth element and the oxide of the second rare-earth element added.

A glass powder having a composition of $SiO_2=55$, $BaO=20$, $CaO=15$, and $Li_2O=10$ (mole %) was used as a sintering auxiliary. The amount of the glass powder added was 1 part by mass based on the 100 parts by mass of the BT powder and the BCT powder.

A mixed solvent of toluene and alcohol was added to these material powders and the resultant mixture was wet blended with zirconia balls having a diameter of 5 mm.

Then, a polyvinyl butyral resin and a mixed solvent of toluene and alcohol were added to the thus-wet-blended powders and the resultant mixture was also wet blended with zirconia balls having a diameter of 5 mm to prepare a ceramic slurry. Ceramic green sheets having a thickness of 3 μm were produced with the ceramic slurry by a doctor blade method.

Then, a plurality of rectangular internal electrode patterns containing Ni as the main component were formed on the upper surfaces of the ceramic green sheets. A conductor paste used for forming the internal electrode patterns contained a Ni powder having a mean particle diameter of 0.3 μm. The conductor paste also contained 30 parts by mass of the BT powder used for the green sheets based on 100 parts by mass of the Ni powder.

Then, 360 ceramic green sheets on which the internal electrode patterns were printed were stacked and 20 ceramic green sheets on which no internal electrode pattern was printed were further stacked respectively on the upper surface and on the lower surface of the resultant stack of the 360 ceramic green sheets. The entire resultant stack was laminated with a pressing machine under conditions of a temperature of 60° C., a pressure of $10^7$ Pa, and a time for 10 minutes and cut into a certain size. Thus, capacitor compact bodies were obtained.

Then, the resulting green laminate was cut into a predetermined shape, thereby affording a green capacitor body. The green capacitor body was heated at a heating rate of 10° C./h in air and degreased at 300° C./h. The capacitor body was heated at a heating rate of 300° C./h from 500° C. and subjected to firing at 1170° C. for 2 hours (hereinafter, referred to as "reduction firing"), thereby affording a capacitor body. In this case, The furnace was cooled to 1000° C. at a cooling rate of 300° C./h after the abovementioned reducing firing. The capacitor body was subjected to reoxidation treatment at 1000° C. for 4 hours in a nitrogen atmosphere and then cooling at a cooling rate of 300° C./h, thereby affording a capacitor body. These capacitor bodies had dimensions of 0.95×0.48×0.48 mm³ and dielectric layers had a thickness of 2 μm. The area of the internal electrode layers was 0.3 mm².

Then, the capacitor bodies obtained by the firing were then subjected to barrel polishing. After that, an external electrode paste containing a Cu powder and glass was applied to the both ends of the capacitor bodies and baked at 850° C. to form external electrodes. Ni and subsequently Sn were plated on the surfaces of the external electrodes with an electrolysis barrel apparatus. Thus, multilayer ceramic capacitors were produced.

The multilayer ceramic capacitors composed of the capacitor bodies obtained by the reoxidation treatment were again subjected to a heat treatment in hydrogen-nitrogen at 1150° C. for 2 hours (hereinafter, referred to as a "rereduction treatment"). A sample was prepared as in sample No. 4, except that manganese was not added. This sample was not evaluated because it was reduced.

<Evaluation>

These multilayer ceramic capacitors were evaluated in terms of the following properties. The capacitance was determined under measurement conditions of a frequency of 1.0 kHz and a measurement voltage of 1 Vrms. The insulation resistance was evaluated in terms of samples in which the external electrodes were formed on the capacitor bodies after the reduction firing, samples in which the external electrodes were formed after the reoxidation treatment, and samples subjected to the rereduction treatment. Samples were subjected to a high temperature loading test at a temperature of 140° C. and at a voltage of 30V and evaluated by measuring the insulation resistance of the samples after the lapse of 100 hours under these conditions. The number of the samples in each evaluation was 30.

A cross section of the dielectric layers were polished by ion milling until a hole is formed at the center thereof and the surface is observable. An image of the polished surface obtained by polishing was projected in a transmission electron microscope and was input into a computer. A diagonal line was drawn on the image on the screen of the computer and the areas of crystal grains on the diagonal line were measured by subjecting the contours of the grains to image processing. The mean diameter of the whole crystal grains constituted by crystal grains constituting the first crystal group and crystal grains constituting the second crystal group were calculated as the diameters of circles having the same areas as the grains. The mean diameter was obtained as a mean value of the thus-calculated diameters of about 50 crystal grains.

The Ca concentration of the crystal grains was obtained by subjecting about 30 crystal grains present in a polished surface of dielectric layers obtained by polishing a section of a multilayer ceramic capacitor in the stacked direction to elemental analysis with a transmission electron microscope equipped with an elemental analysis device. In this case, the spot size of electron beams was 5 nm. The analysis was conducted at five points that were present from near the grain boundary to the center of each crystal grain. The crystal grains were selected in the following manner. The areas of crystal grains were measured by image processing on the basis of the contours of the grains. The diameters of the grains were calculated as the diameters of circles having the same areas as the grains. Crystal grains that had diameters within the range of ±30% from the mean crystal grain diameter were selected as the crystal grains. Crystal grains having a Ca concentration of 0.2 atomic % or less were categorized as the first crystal group and crystal grains having a Ca concentration of 0.4 atomic % or more were categorized as the second crystal group. Polishing conditions were the same as those in the method for determining an average grain diameter.

The mean diameter of the crystal grains constituting the first crystal group and the mean diameter of the crystal grains constituting the second crystal group were calculated from the areal data of the crystal grains constituting the first crystal group and the crystal grains constituting the second crystal group, the areal data being obtained when the Ca concentration was determined above. In this case, an image of a polished surface obtained by polishing a section of the dielectric layers by ion milling, the image being projected in a transmission electron microscope, was input into a computer. The contours of the crystal grains on the screen of the computer were subjected to image processing and the areas of the crystal grains were measured. The diameters of the grains were calculated as the diameters of circles having the same areas as the grains. Each mean diameter was obtained as a mean value of the thus-calculated diameters of about 50 crystal grains.

Following this analysis, the area proportion in terms of the crystal grains constituting the first crystal group and the crystal grains constituting the second crystal group, the first crystal group and the second crystal group constituting the dielectric layers, was calculated from the areal data obtained in the above-described determination of each mean diameter of about 50 crystal grains. This area proportion is represented by b/(a+b) wherein a represents the area of crystal grains 1a constituting the first crystal group and b represents the area of crystal grains 1b constituting the second crystal group. In this case, crystal grains having a Ca concentration of more than 0.4 atomic % (rounding off the number to the first decimal place) were categorized as the crystal grains of the second crystal group. As shown in Tables 1 to 4, samples in which the BT powder and the BCT powder were mixed had increased proportions of crystal grains having a Ca concentration of 0.4 atomic % or more after firing due to diffusion of Ca during the firing in comparison with the mixing proportions of the BT powder and the BCT powder. These samples contained both crystal grains having a Ca concentration of 0.2 atomic % or less and crystal grains having a Ca concentration of 0.4 atomic % or more.

The ratios of the concentrations of magnesium and a rare-earth element were measured with a transmission electron microscope equipped with an elemental analysis device (EDS). In this case, a sample to be analyzed was obtained by polishing a multilayer ceramic capacitor in the stacked direction and selecting the crystal grains of the first crystal group and the crystal grains of the second crystal group on the polished surface of the dielectric layers in accordance with the determination based on the measurement of the Ca concentration described above. These crystal grains were selected in the following manner. The areas of crystal grains were measured by image processing on the basis of the contours of the grains. The diameters of the grains were calculated as the diameters of circles having the same areas as the grains. Crystal grains that had diameters within the range of ±30% from the mean crystal grain diameter were selected as the crystal grains. Ten crystal grains in this range were respectively selected in terms of the crystal grains of the first crystal group and the crystal grains of the second crystal group. In this case, polishing conditions were also the same as those in the method for determining an average grain diameter.

In this analysis, the spot size of electron beams in elemental analysis was 1 to 3 nm. The analysis was conducted for the surface portion and the center portion of a crystal grain. The surface portion of a crystal grain was defined as a region within 3 nm from the grain boundary of the crystal grain and was defined as a region within a circle having its center at the center of the inscribed circle of the crystal grain and having a radius of ⅓ of the radius of the inscribed circle. In this case, the inscribed circle of a crystal grain was drawn on an image projected in a transmission electron microscope on the screen of a computer. On the basis of the image on the screen, the center portion of the crystal grain was determined. The inscribed circle is defined as the largest inscribed circle surrounded by the crystal grains.

The concentrations of magnesium and a rare-earth element of each crystal grain was determined in the center portion of the crystal grain shown in a micrograph taken with a transmission electron microscope and in the surface portion of the crystal grain, the center portion being within the inscribed circle of the crystal grain. In this case, the ratios of the concentrations of magnesium and a rare-earth element were determined by the above-described method.

On the basis of the thus-determined concentrations of magnesium and the rare-earth element in each crystal grain, the concentration ratios of magnesium and the rare-earth element in the surface portion and the center portion of each crystal grain were obtained. The average value of the thus-obtained concentration ratios of 10 crystal grains was determined.

The compositions of the thus-obtained samples, which were sinters, were analyzed by ICP analysis or atomic absorption spectroscopy. Specifically, a mixture of each resultant dielectric ceramic, boric acid and sodium carbonate was melted and dissolved in hydrochloric acid, and the resultant solution was qualitatively analyzed by atomic absorption spectroscopy for elements contained in the dielectric ceramic. Then, the identified elements were quantified by ICP emission spectroscopy with standard samples obtained by diluting standard solutions of the elements. The amounts of oxygen were measured with the assumption that the elements had valences shown in the periodic table.

Table 1 shows compositions fed. Table 2 shows elemental compositions in sintered bodies on an oxide basis. Tables 3 and 4 show properties. The amounts of MgO, $Y_2O_3$, $Dy_2O_3$, $Ho_2O_3$, $Tb_2O_3$, MnO, and $V_2O_5$ shown in Table 2 are values with respect to 100 mol of titanium constituting barium titanate contained in the dielectric ceramic. In Table 4, for example, "2.0E+10" described in the section of the insulation resistance after reoxidation of sample No. 1 means $2.0 \times 10^{10}$.

TABLE 1

| Sample No. | BCT powder mol % | BT powder mol % | MgO mol | First rare-earth element Element | First rare-earth element mol | Second rare-earth element Element | Second rare-earth element mol | $MnCO_3$ mol | $V_2O_5$ mol |
|---|---|---|---|---|---|---|---|---|---|
| * 1 | 50 | 50 | 0.7 | Y | 0.70 | Tb | 0.20 | 0.2 | 0.00 |
| 2 | 50 | 50 | 0.7 | Y | 0.70 | Tb | 0.20 | 0.2 | 0.05 |
| 3 | 50 | 50 | 0.7 | Y | 0.70 | Tb | 0.20 | 0.2 | 0.10 |
| 4 | 50 | 50 | 0.7 | Y | 0.70 | Tb | 0.20 | 0.2 | 0.15 |
| 5 | 50 | 50 | 0.7 | Y | 0.70 | Tb | 0.20 | 0.2 | 0.20 |
| 6 | 50 | 50 | 0.7 | Y | 0.70 | Tb | 0.20 | 0.2 | 0.30 |
| 7 | 50 | 50 | 0.7 | Y | 0.70 | Tb | 0.20 | 0.2 | 0.40 |
| 8 | 50 | 50 | 0.7 | Y | 0.70 | Tb | 0.20 | 0.2 | 0.50 |
| * 9 | 0 | 100 | 0.7 | Y | 0.70 | Tb | 0.20 | 0.2 | 0.15 |
| * 10 | 100 | 0 | 0.7 | Y | 0.70 | Tb | 0.20 | 0.2 | 0.15 |
| 11 | 50 | 50 | 0.5 | Y | 0.50 | Tb | 0.20 | 0.2 | 0.15 |
| 12 | 50 | 50 | 0.3 | Y | 0.30 | Tb | 0.20 | 0.2 | 0.15 |
| 13 | 50 | 50 | 0.3 | Y | 0.70 | Tb | 0.20 | 0.2 | 0.15 |
| 14 | 50 | 50 | 1.0 | Y | 0.70 | Tb | 0.20 | 0.2 | 0.15 |
| 15 | 50 | 50 | 1.5 | Y | 0.70 | Tb | 0.20 | 0.2 | 0.15 |

TABLE 1-continued

| Sample No. | BCT powder mol % | BT powder mol % | MgO mol | First rare-earth element Element | First rare-earth element mol | Second rare-earth element Element | Second rare-earth element mol | MnCO₃ mol | V₂O₅ mol |
|---|---|---|---|---|---|---|---|---|---|
| 16 | 50 | 50 | 0.7 | Y | 1.00 | Tb | 0.20 | 0.2 | 0.15 |
| 17 | 50 | 50 | 0.7 | Y | 1.50 | Tb | 0.20 | 0.2 | 0.15 |
| 18 | 50 | 50 | 0.7 | Y | 0.30 | Tb | 0.20 | 0.2 | 0.15 |
| 19 | 50 | 50 | 0.7 | Y | 0.70 | Tb | 0.20 | 0.07 | 0.15 |
| 20 | 50 | 50 | 0.7 | Y | 0.70 | Tb | 0.20 | 0.1 | 0.15 |
| 21 | 50 | 50 | 0.7 | Y | 0.70 | Tb | 0.20 | 0.3 | 0.15 |
| 22 | 50 | 50 | 0.7 | Y | 0.70 | Tb | 0.20 | 0.4 | 0.15 |
| * 23 | 50 | 50 | 0.7 | Y | 0.70 | None | — | 0.4 | 0.15 |
| * 24 | 50 | 50 | 0.7 | None | — | Tb | 0.20 | 0.4 | 0.15 |
| 25 | 50 | 50 | 0.7 | Y | 0.70 | Dy | 0.20 | 0.2 | 0.15 |
| 26 | 50 | 50 | 0.7 | Ho | 0.70 | Dy | 0.20 | 0.2 | 0.15 |
| 27 | 50 | 50 | 0.7 | Ho | 0.70 | Tb | 0.20 | 0.2 | 0.15 |
| 28 | 50 | 50 | 0.7 | Y | 0.30 | Tb | 0.70 | 0.2 | 0.20 |
| 29 | 50 | 50 | 0.7 | Y | 0.70 | Tb | 0.20 | 0.2 | 0.20 |
| * 30 | 20 | 80 | 0.7 | Y | 0.70 | Tb | 0.20 | 0.2 | 0.20 |
| 31 | 30 | 70 | 0.7 | Y | 0.70 | Tb | 0.20 | 0.2 | 0.20 |
| 32 | 60 | 40 | 0.7 | Y | 0.70 | Tb | 0.20 | 0.2 | 0.20 |
| * 33 | 70 | 30 | 0.7 | Y | 0.70 | Tb | 0.20 | 0.2 | 0.20 |
| 34 | 50 | 50 | 0.7 | Y | 0.70 | Tb | 0.10 | 0.2 | 0.20 |
| 35 | 50 | 50 | 0.7 | Y | 0.70 | Tb | 0.30 | 0.2 | 0.20 |
| 36 | 50 | 50 | 0.2 | Y | 0.70 | Tb | 0.20 | 0.2 | 0.15 |
| 37 | 50 | 50 | 1.8 | Y | 0.70 | Tb | 0.20 | 0.2 | 0.15 |
| 38 | 50 | 50 | 0.7 | Y | 0.20 | Tb | 0.10 | 0.2 | 0.15 |
| 39 | 50 | 50 | 0.7 | Y | 1.50 | Tb | 0.40 | 0.2 | 0.15 |
| 40 | 50 | 50 | 0.7 | Y | 0.70 | Tb | 0.20 | 0.5 | 0.15 |

* Samples with asterisks are not within the scope of the present invention.

TABLE 2

| Sample No. | b/(a + b) ** | MgO mol | First rare-earth element Element | First rare-earth element mol | Second rare-earth element Element | Second rare-earth element mol | MnO mol | V₂O₅ mol |
|---|---|---|---|---|---|---|---|---|
| * 1 | 0.7 | 0.7 | Y | 0.70 | Tb | 0.20 | 0.2 | 0.00 |
| 2 | 0.7 | 0.7 | Y | 0.70 | Tb | 0.20 | 0.2 | 0.05 |
| 3 | 0.7 | 0.7 | Y | 0.70 | Tb | 0.20 | 0.2 | 0.10 |
| 4 | 0.7 | 0.7 | Y | 0.70 | Tb | 0.20 | 0.2 | 0.15 |
| 5 | 0.7 | 0.7 | Y | 0.70 | Tb | 0.20 | 0.2 | 0.20 |
| 6 | 0.7 | 0.7 | Y | 0.70 | Tb | 0.20 | 0.2 | 0.30 |
| 7 | 0.7 | 0.7 | Y | 0.70 | Tb | 0.20 | 0.2 | 0.40 |
| 8 | 0.7 | 0.7 | Y | 0.70 | Tb | 0.20 | 0.2 | 0.50 |
| * 9 | 0 | 0.7 | Y | 0.70 | Tb | 0.20 | 0.2 | 0.15 |
| * 10 | 1 | 0.7 | Y | 0.70 | Tb | 0.20 | 0.2 | 0.15 |
| 11 | 0.7 | 0.5 | Y | 0.50 | Tb | 0.20 | 0.2 | 0.15 |
| 12 | 0.7 | 0.3 | Y | 0.30 | Tb | 0.20 | 0.2 | 0.15 |
| 13 | 0.7 | 0.3 | Y | 0.70 | Tb | 0.20 | 0.2 | 0.15 |
| 14 | 0.7 | 1.0 | Y | 0.70 | Tb | 0.20 | 0.2 | 0.15 |
| 15 | 0.7 | 1.5 | Y | 0.70 | Tb | 0.20 | 0.2 | 0.15 |
| 16 | 0.7 | 0.7 | Y | 1.00 | Tb | 0.20 | 0.2 | 0.15 |
| 17 | 0.7 | 0.7 | Y | 1.50 | Tb | 0.20 | 0.2 | 0.15 |
| 18 | 0.7 | 0.7 | Y | 0.30 | Tb | 0.20 | 0.2 | 0.15 |
| 19 | 0.7 | 0.7 | Y | 0.70 | Tb | 0.20 | 0.07 | 0.15 |
| 20 | 0.7 | 0.7 | Y | 0.70 | Tb | 0.20 | 0.1 | 0.15 |
| 21 | 0.7 | 0.7 | Y | 0.70 | Tb | 0.20 | 0.3 | 0.15 |
| 22 | 0.7 | 0.7 | Y | 0.70 | Tb | 0.20 | 0.4 | 0.15 |
| * 23 | 0.7 | 0.7 | Y | 0.70 | None | — | 0.4 | 0.15 |
| * 24 | 0.7 | 0.7 | None | — | Tb | 0.20 | 0.4 | 0.15 |
| 25 | 0.7 | 0.7 | Y | 0.70 | Dy | 0.20 | 0.2 | 0.15 |
| 26 | 0.7 | 0.7 | Ho | 0.70 | Dy | 0.20 | 0.2 | 0.15 |
| 27 | 0.7 | 0.7 | Ho | 0.70 | Tb | 0.20 | 0.2 | 0.15 |
| 28 | 0.7 | 0.7 | Y | 0.30 | Tb | 0.70 | 0.2 | 0.20 |
| 29 | 0.7 | 0.7 | Y | 0.70 | Tb | 0.20 | 0.2 | 0.20 |
| * 30 | 0.4 | 0.7 | Y | 0.70 | Tb | 0.20 | 0.2 | 0.20 |
| 31 | 0.5 | 0.7 | Y | 0.70 | Tb | 0.20 | 0.2 | 0.20 |
| 32 | 0.8 | 0.7 | Y | 0.70 | Tb | 0.20 | 0.2 | 0.20 |
| * 33 | 0.9 | 0.7 | Y | 0.70 | Tb | 0.20 | 0.2 | 0.20 |
| 34 | 0.7 | 0.7 | Y | 0.70 | Tb | 0.10 | 0.2 | 0.20 |
| 35 | 0.7 | 0.7 | Y | 0.70 | Tb | 0.30 | 0.2 | 0.20 |
| 36 | 0.7 | 0.2 | Y | 0.70 | Tb | 0.20 | 0.2 | 0.15 |
| 37 | 0.7 | 1.8 | Y | 0.70 | Tb | 0.20 | 0.2 | 0.15 |
| 38 | 0.7 | 0.7 | Y | 0.20 | Tb | 0.10 | 0.2 | 0.15 |

TABLE 2-continued

| Sample No. | b/(a + b) ** — | MgO mol | First rare-earth element Element | First rare-earth element mol | Second rare-earth element Element | Second rare-earth element mol | MnO mol | $V_2O_5$ mol |
|---|---|---|---|---|---|---|---|---|
| 39 | 0.7 | 0.7 | Y | 1.50 | Tb | 0.40 | 0.2 | 0.15 |
| 40 | 0.7 | 0.7 | Y | 0.70 | Tb | 0.20 | 0.5 | 0.15 |

** The area ratio, wherein a represents the area of crystal grains constituting the first crystal group, and b represents the area of crystal grains constituting the second crystal group.

TABLE 3

| | Crystal grain of first crystal group | | | Crystal grain of second crystal group | | |
|---|---|---|---|---|---|---|
| | Ratio of concentration of additive in middle portion to that in surface portion of crystal grain | | Average crystal grain | Ratio of concentration of additive in middle portion to that in surface portion of crystal grain | | Average crystal grain |
| Sample No. | Mg — | Y — | diameter μm | Mg — | Y — | diameter μm |
| * 1 | 0.80 | 0.37 | 0.12 | 0.09 | 0.37 | 0.14 |
| 2 | 0.85 | 0.39 | 0.17 | 0.10 | 0.38 | 0.15 |
| 3 | 0.86 | 0.40 | 0.21 | 0.10 | 0.37 | 0.15 |
| 4 | 0.87 | 0.41 | 0.23 | 0.11 | 0.38 | 0.15 |
| 5 | 0.88 | 0.43 | 0.25 | 0.11 | 0.39 | 0.15 |
| 6 | 0.89 | 0.43 | 0.30 | 0.11 | 0.39 | 0.15 |
| 7 | 0.91 | 0.44 | 0.35 | 0.11 | 0.39 | 0.15 |
| 8 | 0.92 | 0.45 | 0.41 | 0.12 | 0.40 | 0.16 |
| * 9 | 0.93 | 0.51 | 0.47 | — | — | — |
| * 10 | — | — | — | 0.11 | 0.40 | 0.15 |
| 11 | 0.87 | 0.41 | 0.26 | 0.11 | 0.38 | 0.15 |
| 12 | 0.83 | 0.39 | 0.35 | 0.11 | 0.38 | 0.19 |
| 13 | 0.84 | 0.42 | 0.33 | 0.10 | 0.38 | 0.17 |
| 14 | 0.92 | 0.40 | 0.27 | 0.13 | 0.38 | 0.16 |
| 15 | 0.92 | 0.40 | 0.26 | 0.13 | 0.38 | 0.16 |
| 16 | 0.92 | 0.40 | 0.27 | 0.13 | 0.38 | 0.16 |
| 17 | 0.92 | 0.40 | 0.26 | 0.13 | 0.38 | 0.16 |
| 18 | 0.88 | 0.40 | 0.34 | 0.11 | 0.39 | 0.18 |
| 19 | 0.88 | 0.43 | 0.35 | 0.11 | 0.39 | 0.18 |
| 20 | 0.88 | 0.43 | 0.30 | 0.11 | 0.39 | 0.17 |
| 21 | 0.93 | 0.44 | 0.25 | 0.11 | 0.38 | 0.15 |
| 22 | 0.93 | 0.45 | 0.26 | 0.11 | 0.39 | 0.15 |
| * 23 | 0.85 | 0.38 | 0.15 | 0.10 | 0.38 | 0.17 |
| * 24 | 0.85 | — | — | 0.10 | — | — |
| 25 | 0.87 | 0.41 | 0.23 | 0.11 | 0.38 | 0.15 |
| 26 | 0.86 | (Ho) 0.40 | 0.25 | 0.11 | (Ho) 0.39 | 0.16 |
| 27 | 0.88 | (Ho) 0.40 | 0.25 | 0.10 | (Ho) 0.38 | 0.15 |
| 28 | 0.87 | 0.41 | 0.24 | 0.11 | 0.35 | 0.17 |
| 29 | 0.90 | 0.50 | 0.22 | 0.20 | 0.40 | 0.25 |
| * 30 | 0.88 | 0.43 | 0.25 | 0.11 | 0.39 | 0.15 |
| 31 | 0.88 | 0.43 | 0.25 | 0.11 | 0.39 | 0.15 |
| 32 | 0.88 | 0.43 | 0.25 | 0.11 | 0.39 | 0.15 |
| * 33 | 0.88 | 0.43 | 0.25 | 0.11 | 0.39 | 0.15 |
| 34 | 0.88 | 0.43 | 0.25 | 0.11 | 0.39 | 0.15 |
| 35 | 0.88 | 0.43 | 0.25 | 0.11 | 0.39 | 0.15 |
| 36 | 0.87 | 0.41 | 0.23 | 0.11 | 0.38 | 0.15 |
| 37 | 0.87 | 0.41 | 0.23 | 0.11 | 0.38 | 0.15 |
| 38 | 0.87 | 0.41 | 0.23 | 0.11 | 0.38 | 0.15 |
| 39 | 0.87 | 0.41 | 0.23 | 0.11 | 0.38 | 0.15 |
| 40 | 0.87 | 0.41 | 0.23 | 0.11 | 0.38 | 0.15 |

* Samples with asterisks are not within the scope of the present invention.

TABLE 4

| | After reducing firing | | After reoxidation | | | After re-reducing firing | |
|---|---|---|---|---|---|---|---|
| Sample No. | insulation resistance (IR) Applied voltage: 25 V Temperature: 25° C. Ω | Capacitance μF | Insulation resistance (IR) Applied voltage: 25 V Temperature: 25° C. Ω | Capacitance μF | Insulation resistance 100 hours after high-temperature load test Ω | Insulation resistance (IR) Applied voltage: 25 V Temperature: 25° C. Ω | Capacitance μF |
| * 1 | Unmeasurable | 0.410 | 2.E+10 | 0.422 | 2.0E+05 | Unmeasurable | 0.410 |
| 2 | 1.E+10 | 0.470 | 1.E+10 | 0.474 | 2.0E+06 | 1.E+10 | 0.470 |
| 3 | 1.E+09 | 0.470 | 1.E+09 | 0.473 | 2.0E+07 | 1.E+09 | 0.470 |

TABLE 4-continued

| | After reducing firing | | After reoxidation | | | After re-reducing firing | |
|---|---|---|---|---|---|---|---|
| Sample No. | insulation resistance (IR) Applied voltage: 25 V Temperature: 25° C. Ω | Capacitance μF | Insulation resistance (IR) Applied voltage: 25 V Temperature: 25° C. Ω | Capacitance μF | Insulation resistance 100 hours after high-temperature load test Ω | Insulation resistance (IR) Applied voltage: 25 V Temperature: 25° C. Ω | Capacitance μF |
| 4 | 1.E+09 | 0.470 | 1.E+09 | 0.471 | 4.0E+07 | 1.E+09 | 0.470 |
| 5 | 1.E+09 | 0.471 | 1.E+09 | 0.473 | 4.0E+07 | 1.E+09 | 0.471 |
| 6 | 1.E+09 | 0.472 | 1.E+09 | 0.475 | 4.0E+07 | 1.E+09 | 0.472 |
| 7 | 1.E+08 | 0.472 | 1.E+08 | 0.472 | 4.0E+07 | 1.E+08 | 0.471 |
| 8 | 1.E+07 | 0.470 | 1.E+07 | 0.473 | 8.0E+05 | 1.E+07 | 0.470 |
| *9 | Unmeasurable | 0.470 | 1.E+09 | 0.480 | 2.0E+05 | Unmeasurable | 0.470 |
| *10 | Unmeasurable | 0.470 | 1.E+09 | 0.480 | 2.0E+05 | Unmeasurable | 0.470 |
| 11 | 1.E+09 | 0.470 | 1.E+09 | 0.472 | 5.0E+07 | 1.E+09 | 0.470 |
| 12 | 1.E+09 | 0.475 | 1.E+09 | 0.477 | 2.0E+07 | 1.E+09 | 0.475 |
| 13 | 1.E+09 | 0.470 | 1.E+09 | 0.475 | 2.0E+07 | 1.E+09 | 0.470 |
| 14 | 1.E+09 | 0.470 | 1.E+09 | 0.472 | 2.0E+07 | 1.E+09 | 0.470 |
| 15 | 1.E+09 | 0.450 | 1.E+09 | 0.451 | 2.0E+07 | 1.E+09 | 0.450 |
| 16 | 1.E+09 | 0.460 | 1.E+09 | 0.461 | 2.0E+07 | 1.E+09 | 0.460 |
| 17 | 1.E+09 | 0.455 | 1.E+09 | 0.456 | 2.0E+08 | 1.E+09 | 0.455 |
| 18 | 1.E+09 | 0.470 | 1.E+09 | 0.471 | 2.0E+07 | 1.E+09 | 0.470 |
| 19 | 7.E+08 | 0.465 | 7.E+08 | 0.465 | 2.0E+07 | 7.E+08 | 0.465 |
| 20 | 1.E+09 | 0.470 | 1.E+09 | 0.473 | 2.0E+07 | 1.E+09 | 0.470 |
| 21 | 1.E+09 | 0.470 | 1.E+09 | 0.472 | 2.0E+07 | 1.E+09 | 0.470 |
| 22 | 1.E+09 | 0.450 | 1.E+09 | 0.451 | 2.0E+07 | 1.E+09 | 0.450 |
| *23 | 1.E+09 | 0.485 | 1.E+09 | 0.488 | 3.0E+05 | 1.E+09 | 0.485 |
| *24 | Unmeasurable | 0.475 | 1.E+09 | 0.487 | 4.0E+05 | Unmeasurable | 0.476 |
| 25 | 1.E+09 | 0.470 | 1.E+09 | 0.472 | 1.0E+07 | 1.E+09 | 0.470 |
| 26 | 1.E+09 | 0.460 | 1.E+09 | 0.463 | 1.0E+07 | 1.E+09 | 0.460 |
| 27 | 1.E+09 | 0.450 | 1.E+09 | 0.450 | 1.0E+07 | 1.E+09 | 0.450 |
| 28 | 1.E+09 | 0.471 | 1.E+09 | 0.473 | 8.0E+05 | 1.E+09 | 0.471 |
| 29 | 1.E+09 | 0.471 | 1.E+09 | 0.474 | 7.0E+05 | 1.E+09 | 0.471 |
| *30 | 1.E+06 | 0.460 | 1.E+08 | 0.460 | 4.0E+05 | 1.E+06 | 0.460 |
| 31 | 1.E+08 | 0.471 | 1.E+09 | 0.473 | 2.0E+07 | 1.E+07 | 0.470 |
| 32 | 1.E+09 | 0.471 | 1.E+09 | 0.473 | 4.0E+07 | 1.E+08 | 0.471 |
| *33 | 8.E+06 | 0.40 | 1.E+09 | 0.400 | 4.0E+05 | 8.E+06 | 0.40 |
| 34 | 1.E+09 | 0.471 | 1.E+09 | 0.473 | 3.8E+07 | 1.E+09 | 0.471 |
| 35 | 1.E+09 | 0.471 | 1.E+09 | 0.473 | 2.0E+07 | 1.E+09 | 0.471 |
| 36 | 9.E+06 | 0.470 | 1.E+09 | 0.471 | 1.0E+07 | 9.E+06 | 0.470 |
| 37 | 9.E+06 | 0.470 | 1.E+09 | 0.471 | 1.0E+07 | 9.E+06 | 0.470 |
| 38 | 9.E+06 | 0.470 | 1.E+09 | 0.471 | 1.0E+07 | 9.E+06 | 0.470 |
| 39 | 9.E+06 | 0.470 | 1.E+09 | 0.471 | 1.0E+07 | 9.E+06 | 0.470 |
| 40 | 1.E+09 | 0.440 | 1.E+09 | 0.440 | 4.0E+07 | 1.E+09 | 0.440 |

* Samples with asterisks are not within the scope of the present invention.

As is obvious from the results in Tables 1 to 4, the samples of Nos. 2 to 8, 11 to 22, 25 to 29, 31, 32 and 34 to 40 according to the present invention had an insulation resistance of $9 \times 10^6 \Omega$ or more even after subjected to the reduction firing and also had an insulation resistance of $7 \times 10^5 \Omega$ or more after the lapse of 100 hours in the high temperature loading test, which was a high insulation property.

Among sample Nos. 4, 26, and 27 having the same dielectric ceramic composition, except for compositions of the rare-earth elements, sample No. 4 in which the two rare-earth elements were yttrium and terbium had a high insulation resistance after the high-temperature load test and exhibited only a small reduction in insulation resistance.

Sample Nos. 2 to 8, 11 to 22, 25 to 28, 31, 32 and 34 to 40 in which the mean diameter of the crystal grains of the first crystal group was larger than the mean diameter of the crystal grains of the second crystal group had an insulation resistance of $8 \times 10^5 \Omega$ or more after subjected to the high temperature loading test.

Furthermore, among those samples having the average crystal grain diameter of crystal grains constituting the first crystal group larger than the average crystal grain diameter of crystal grains constituting the second crystal group, samples Nos. 3 to 7, 11 to 22, 25 to 27, 31, 32 and 34 to 40 in which the dielectric layers contained 0.3 to 1.5 mole of magnesium in terms of MgO, 0.3 to 1.5 mole of the first rare-earth element in terms of $RE_2O_3$, 0.1 to 0.3 mole of the second rare-earth element in terms of $RE_2O_3$, 0.07 to 0.5 moles of manganese in terms of MnO, and 0.1 to 0.4 moles of vanadium in terms of $V_2O_5$, based on 100 moles of titanium constituting the barium titanate, had an insulation resistance of $1 \times 10^7 \Omega$ or more 100 hours after the high-temperature load test.

Even in the case where the resulting multilayer ceramic capacitors as the samples of the present invention were subjected to heat treatment again in a reducing atmosphere, any sample had an insulation resistance of $9 \times 10^6 \Omega$ or more.

In contrast, the insulation resistance after the firing was not measurable in samples (Sample Nos. 9 and 10) in which the dielectric layers were not constituted by the crystal grains of the first crystal group and crystal grains of the second crystal group, in Sample No. 1 in which $V_2O_5$ was not added, and in Sample No. 23 in which only one of $Tb_2O_3$ is added. When the ratio b/(a+b) was less than 0.5 and the ratio b/(a+b) was more than 0.8, the insulation resistance after the reduction firing and the rereduction treatment was less than $9 \times 10^6 \Omega$.

The invention claimed is:

1. A multilayer ceramic capacitor comprising dielectric layers and internal electrode layers disposed alternately, the dielectric layers including a dielectric ceramic containing barium titanate as a main component, calcium, magnesium, vanadium, manganese, a first rare-earth element of yttrium or holmium and a second rare-earth element of terbium or dysprosium, wherein crystals constituting the dielectric ceramic include a first crystal group constituted by crystal grains containing the barium titanate as a main component and containing the calcium in a concentration of 0.2 atomic % or less and a second crystal group constituted by crystal grains containing the barium titanate as a main component and containing the calcium in a concentration of 0.4 atomic % or more;

each crystal grains of the first crystal group and the second crystal group comprising magnesium, vanadium, manganese, the first rare-earth element and the second rare-earth element;

ratios (C2/C1) of concentrations (C2) of the magnesium and the first rare-earth element contained in center portions of the crystal grains constituting the first crystal group to concentrations (C1) of the magnesium and the first rare-earth element contained in surface layers of the crystal grains constituting the first crystal group are respectively larger than ratios (C4/C3) of concentrations (C4) of the magnesium and the first rare-earth element contained in center portions of the crystal grains constituting the second crystal group to concentrations (C3) of the magnesium and the first rare-earth element contained in surface layers of the crystal grains constituting the second crystal group; and b/(a+b) is 0.5 to 0.8 where, in a polished surface obtained by polishing a surface of the dielectric ceramic, a represents an area of the crystal grains constituting the first crystal group and b represents an area of the crystal grains constituting the second crystal group.

2. The multilayer ceramic capacitor according to claim 1, wherein the first rare-earth element is yttrium and the second rare-earth element is terbium.

3. The multilayer ceramic capacitor according to claim 1, wherein a mean diameter of the crystal grains constituting the first crystal group is larger than a mean diameter of the crystal grains constituting the second crystal group.

4. The multilayer ceramic capacitor according to claim 1, wherein
the crystal grains constituting the first crystal group has a mean diameter larger than the crystal grains constituting the second crystal group in the dielectric ceramic, and
the dielectric ceramic contains 0.3 to 1.5 mole of the magnesium in terms of MgO, 0.3 to 1.5 mole of the first rare-earth element in terms of $RE_2O_3$, 0.1 to 0.3 mole of the second rare-earth element in terms of $RE_2O_3$, 0.07 to 0.5 moles of the manganese in terms of MnO, and 0.1 to 0.4 moles of the vanadium in terms of $V_2O_5$, based on 100 moles of the barium titanate.

* * * * *